US012416936B2

(12) United States Patent
Thakur

(10) Patent No.: US 12,416,936 B2
(45) Date of Patent: Sep. 16, 2025

(54) APPARATUS COMPRISING A BIAS CURRENT GENERATOR

(71) Applicant: Renesas Electronics Corporation, Tokyo (JP)

(72) Inventor: Nishant Singh Thakur, Broxbourne (GB)

(73) Assignee: Renesas Electronics Corporation, Tokyo (JP)

( * ) Notice: Subject to any disclaimer, the term of this patent is extended or adjusted under 35 U.S.C. 154(b) by 371 days.

(21) Appl. No.: 18/082,942

(22) Filed: Dec. 16, 2022

(65) Prior Publication Data

US 2024/0201723 A1 Jun. 20, 2024

(51) Int. Cl.
*G05F 3/24* (2006.01)
*G05F 3/26* (2006.01)

(52) U.S. Cl.
CPC .............. *G05F 3/247* (2013.01); *G05F 3/262* (2013.01)

(58) Field of Classification Search
CPC . G05F 3/247; G05F 3/26; G05F 3/262; G05F 3/24; G05F 3/242
See application file for complete search history.

(56) References Cited

U.S. PATENT DOCUMENTS

| | | | | |
|---|---|---|---|---|
| 3,678,407 A * | 7/1972 | Ahrons | H03F 3/345 | 257/E27.06 |
| 4,247,824 A * | 1/1981 | Hilbourne | H03F 3/45076 | 330/253 |
| 6,194,962 B1 * | 2/2001 | Chen | H03F 3/45766 | 330/253 |
| 7,236,048 B1 * | 6/2007 | Holloway | G05F 3/30 | 327/512 |
| 10,554,218 B1 | 2/2020 | Seesink | | |
| 11,275,399 B2 * | 3/2022 | Sugiura | G05F 3/262 | |
| 2015/0022249 A1 * | 1/2015 | Kinyua | H03K 4/50 | 327/134 |
| 2019/0109589 A1 | 4/2019 | Kobayashi et al. | | |

FOREIGN PATENT DOCUMENTS

| | | | | |
|---|---|---|---|---|
| JP | S6372205 A * | 4/1988 | H03F 3/45 | |

* cited by examiner

*Primary Examiner* — Gary L Laxton
(74) *Attorney, Agent, or Firm* — SCULLY, SCOTT, MURPHY & PRESSER, P.C.

(57) ABSTRACT

An apparatus comprising a bias current generator for generating a bias current, the bias current generator comprising two or more negative threshold transistors of the same type and coupled in series.

18 Claims, 17 Drawing Sheets

1000

| VTH of DVT | Trim<3:0> decimal code |
|---|---|
| 540 | 13 |
| 545 | 13 |
| 550 | 13 |
| 555 | 12 |
| 560 | 12 |
| 565 | 11 |
| 570 | 10 |
| 575 | 9 |
| 580 | 8 |
| 585 | 7 |
| 590 | 6 |
| 595 | 5 |
| 600 | 4 |
| 605 | 3 |
| 610 | 2 |
| 615 | 1 |
| 620 | 0 |

1103

*Figure 11(c)*

With proposed nmos resistor

| Corner | case | temperature | Pass/Fail | /NM15/D | idc |
|---|---|---|---|---|---|
| typ_test_0 | 0 | -40 | | | 1.023n |
| typ_test_1 | 0 | 125 | | | 1.416n |
| typ_test_2 | 1 | -40 | | | 419.9p |
| typ_test_3 | 1 | 125 | | | 842.8p |
| typ_test_4 | 2 | -40 | | | 2.066n |
| typ_test_5 | 2 | 125 | | | 2.244n |
| typ_test_6 | 3 | -40 | | | 419.9p |
| typ_test_7 | 3 | 125 | | | 842.8p |
| typ_test_8 | 4 | -40 | | | 2.066n |
| typ_test_9 | 4 | 125 | | | 2.244n |
| typ_test_10 | 5 | -40 | | | 419.9p |
| typ_test_11 | 5 | 125 | | | 842.8p |
| typ_test_12 | 6 | -40 | | | 2.066n |
| typ_test_13 | 6 | 125 | | | 2.244n |

1200 1204 1202

*Figure 12a*

With poly resistor

| Corner | case | temperature | Pass/Fail | /NM15/D | idc |
|---|---|---|---|---|---|
| typ_test_0 | 0 | -40 | | | 803p |
| typ_test_1 | 0 | 125 | | | 2.021n |
| typ_test_2 | 1 | -40 | | | 535.4p |
| typ_test_3 | 1 | 125 | | | 1.419n |
| typ_test_4 | 2 | -40 | | | 1.296n |
| typ_test_5 | 2 | 125 | | | 3.13n |
| typ_test_6 | 3 | -40 | | | 684.4p |
| typ_test_7 | 3 | 125 | | | 1.814n |
| typ_test_8 | 4 | -40 | | | 922.3p |
| typ_test_9 | 4 | 125 | | | 2.231n |
| typ_test_10 | 5 | -40 | | | 955.9p |
| typ_test_11 | 5 | 125 | | | 2.534n |
| typ_test_12 | 6 | -40 | | | 718.4p |
| typ_test_13 | 6 | 125 | | | 1.739n |

1201 1204 1202

*Figure 12b*

APPARATUS COMPRISING A BIAS CURRENT GENERATOR

The present disclosure relates to an apparatus comprising a bias current generator. In particular, the present disclosure relates to a bias current generator comprising a plurality of negative threshold transistors.

BACKGROUND

Bias current generators are circuits used to generate a bias current. A bias current typically refers to a current that is generated and provided to other circuitry, for example on a chip, that requires the bias current for its operation. Multiple nanoampere bias current generators, which are used to generate bias currents on the order of nanoamps, are required in low power chips. Trimming of such circuits using prior art is very time-consuming and hence costly.

Circuits which may include multiple nanoampere bias current generators (for example, eight to ten nanoampere bias current generators) include but are not limited to: a bandgap cell; a low frequency oscillator; a power on reset circuit; an undervoltage-lockout (UVLO) circuit; a test mux buffer; a low dropout regulator (LDO), a LDO current limit bias circuit; and a low voltage start-up circuit.

FIG. 1 is a schematic of a known bias current generator 100 comprising a negative threshold NMOS device 102 and a poly resistor 104 for generating a bias current Ibias. The bias current Ibias is as follows:

$$\text{Ibias} = \frac{Vth_{NMOS}}{R_{poly}} \tag{1}$$

where $Vth_{NMOS}$ is the threshold voltage of the device 102 and $R_{poly}$ is the resistance of the poly resistor.

The disadvantages of the generator 100 are as follows:

- Such circuits include a huge resistor meaning that the circuit will occupy a significant area on a chip compared to other analog active circuits. This is particularly relevant when multiple bias current generators are required on a single chip.
- Multiple measurements are required to evaluate the bias current Ibias as exemplified by equation (1). Specifically, both $Vth_{NMOS}$ and $R_{poly}$ must be measured. or the generated current itself must be measured. However, to measure the generated bias current directly it may be necessary to scale up the bias current to a level that is measurable. This procedure can introduce scaling errors.
- The poly resistor 104 will only carry a small current in nanoampere applications and its resistance $R_{poly}$ will be large, meaning measurement of the resistance $R_{poly}$, and therefore the bias current Ibias, can be time consuming and can result in an increase in cost of measurement.
- Although possible to scale the poly resistor 104 down to decrease its resistance $R_{poly}$ to speed up the measurement process, there will be a scaling error that can result in the inaccuracy of measurement.
- The scaled-up version of generated Ibias current can be measured to speed up the process but, as discussed previously, it will also have a scaling error.
- The challenge in measuring the bias current Ibias can result in a more challenging trimming process than is desirable.

SUMMARY

It is desirable to provide a bias current generator that occupies a smaller area on a chip than known systems.

Furthermore, it is desirable to provide a bias current generator that enables a measurement of its bias current that is faster, more accurate and/or less costly than known systems.

Furthermore, it is desirable to provide a bias current generator that provides an improved trimming process compared with known systems.

According to a first aspect of the disclosure there is provided an apparatus comprising a bias current generator for generating a bias current, the bias current generator comprising two or more negative threshold transistors of the same type and coupled in series.

Optionally, the two or more negative threshold transistors are NMOS or PMOS.

Optionally, the bias current generator comprises a current mirror configured to output the bias current.

Optionally, the current mirror comprises a first mirror transistor, and a second mirror transistor, wherein the first mirror transistor is configured to receive the bias current and to mirror the bias current to the second mirror transistor, and the second mirror transistor is configured to output the bias current as received from the first mirror transistor.

Optionally, the two or more negative threshold transistors comprise a first negative threshold transistor, and one or more second negative threshold transistors.

Optionally, at least one of the one or more second negative threshold transistors has its gate coupled to a second voltage, its drain terminal, or its source terminal.

Optionally, the bias current generator comprises a transistor set comprising the one or more second negative threshold transistors, the first negative threshold transistor comprising a first terminal coupled to a first terminal of the transistor set, and a gate terminal coupled to a second terminal of the transistor set.

Optionally, the first negative threshold transistor comprises a second terminal coupled to a first voltage and/or the second terminal of transistor set is coupled to a second voltage.

Optionally, the bias current generator comprises a cascode transistor, the second terminal of the first negative threshold transistor being coupled to the first voltage via a cascode transistor.

Optionally, the bias current generator comprises a current mirror configured to output the bias current.

Optionally, the current mirror comprises a first mirror transistor, and a second mirror transistor, wherein the second terminal of the first negative threshold transistor is coupled to the first voltage via the first mirror transistor, the first mirror transistor is configured to receive the bias current and to mirror the bias current to the second mirror transistor, and the second mirror transistor is configured to output the bias current as received from the first mirror transistor.

Optionally, the bias current generator comprises a cascode transistor, the second terminal of the first negative threshold transistor being coupled to the first voltage via the first mirror transistor and the cascode transistor.

Optionally, the apparatus comprises measurement circuitry configured to measure a first quantity that is dependent on the bias current.

Optionally, the first quantity comprises a threshold voltage, the threshold voltage being dependent on the bias current.

Optionally, the measurement circuitry comprises a buffer circuit coupled to a threshold voltage terminal and configured to output the threshold voltage.

Optionally, the first negative threshold transistor has a width of approximately 250 nm to approximately 500 nm and a length of approximately 20 micrometers and/or the one or more second negative threshold transistors have a width of approximately 500 nm and a length of approximately 20 micrometers.

Optionally, the apparatus comprises trimming circuitry configured to provide a trimming signal to the bias current generator, the bias current generator adjusting the bias current in response to the trimming signal to provide a desired bias current.

Optionally, the apparatus comprises measurement circuitry configured to measure a first quantity that is dependent on the bias current, wherein the trimming circuitry is configured to receive the measurement of the first quantity, determine the trimming signal necessary to provide to the bias current generator such that the bias current generator will adjust the bias current to provide the desired bias current, and provide the determined trimming signal to the bias current generator.

Optionally, the first quantity comprises a threshold voltage, the threshold voltage being dependent on the bias current.

Optionally, the measurement circuitry comprises a buffer circuit coupled to a threshold voltage terminal and configured to output the threshold voltage.

Optionally, the trimming circuitry comprises a memory element configured to store a look up table comprising a plurality of trimming signal settings, each trimming signal setting being associated with a value of the first quantity.

Optionally, the trimming circuitry is configured to determine the trimming signal by selecting, from the look up table, the trimming signal setting associated with the value of the first quantity as received by the trimming circuity, and setting the trimming signal based on the trimming signal setting as selected, thereby determining the determined trimming signal.

Optionally, the first quantity comprises a threshold voltage, the threshold voltage being dependent on the bias current, such that the value of the first quantity as received by the trimming circuit is the value of the measured threshold voltage.

Optionally, the measurement circuitry comprises a buffer circuit coupled to a threshold voltage terminal and configured to output the threshold voltage.

Optionally, the two or more negative threshold transistors comprises a first negative threshold transistor, and a plurality of second negative threshold transistors, the bias current generator comprises a transistor set comprising a plurality of bit portions, each bit portion comprising at least one of the second negative threshold transistors, wherein the trimming signal is configured to set each bit portion in an enabled or disabled state.

Optionally, the trimming circuitry comprises a memory element configured to store a look up table comprising a plurality of trimming signal settings, each trimming signal setting being associated with a value of the first quantity.

Optionally, the trimming circuitry is configured to determine the trimming signal by selecting, from the look up table, the trimming signal setting associated with the value of the first quantity as received by the trimming circuity, and setting the trimming signal based on the trimming signal setting as selected, thereby determining the determined trimming signal.

Optionally, the first quantity comprises a threshold voltage, the threshold voltage being dependent on the bias current, such that the value of the first quantity as received by the trimming circuit is the value of the measured threshold voltage.

Optionally, the measurement circuitry comprises a buffer circuit coupled to a threshold voltage terminal and configured to output the threshold voltage.

According to a second aspect of the disclosure there is provided a method of providing a bias current comprising providing a bias current generator comprising two or more negative threshold transistors of the same type and coupled in series.

Optionally, the method comprises outputting the bias current using a current mirror.

Optionally, the method comprises providing a trimming signal to the bias current generator using trimming circuitry, and adjusting the bias current in response to the trimming signal to provide a desired bias current.

Optionally, the method comprises measuring a first quantity that is dependent on the bias current using measurement circuitry, receiving the measurement of the first quantity using the trimming circuitry, determining the trimming signal necessary to provide to the bias current generator such that the bias current generator will adjust the bias current to provide the desired bias current, and providing the determined trimming signal to the bias current generator.

Optionally, the first quantity comprises a threshold voltage.

Optionally, the trimming circuitry comprises a memory element configured to store a look up table comprising a plurality of trim signal settings, each trimming signal setting being associated with a value of the first quantity, the method comprising determining the trimming signal by selecting, from the look up table, the trimming signal setting associated with the value of the first quantity as received by the trimming circuity, and setting the trimming signal based on the trimming signal setting as selected, thereby determining the determined trimming signal.

Optionally, the two or more negative threshold transistors comprises a first negative threshold transistor and a plurality of second negative threshold transistors, the bias current generator comprises a transistor set comprising a plurality of bit portions, each bit portion comprising at least one second negative threshold transistor, the method comprising setting each bit portion in an enabled or disabled state using the trimming signal, thereby adjusting the bias current in response to the trimming signal to provide a desired bias current.

It will be appreciated that the method of the second aspect may include providing and/or using features set out in the first aspect and can incorporate other features as described herein.

BRIEF DESCRIPTION OF THE DRAWINGS

The disclosure is described in further detail below by way of example and with reference to the accompanying drawings, in which:

FIG. 12(*a*) is a table showing example simulation results for an implementation of the bias current generator of the present disclosure, FIG. 12(*b*) is a table showing simulation results for an implementation of the circuit of FIG. 1.

DETAILED DESCRIPTION

Figure 2A:
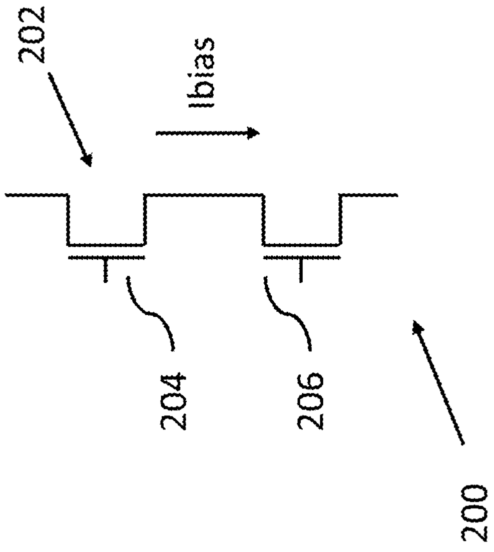
FIG. 2(*a*) is a schematic of an apparatus comprising a bias current generator in accordance with a first embodiment of the present disclosure, FIG. 2(*b*) is a schematic of a specific embodiment of the bias current generator, FIG. 2(*c*) is a schematic of a further specific embodiment of the bias current generator.
Figure 2B:
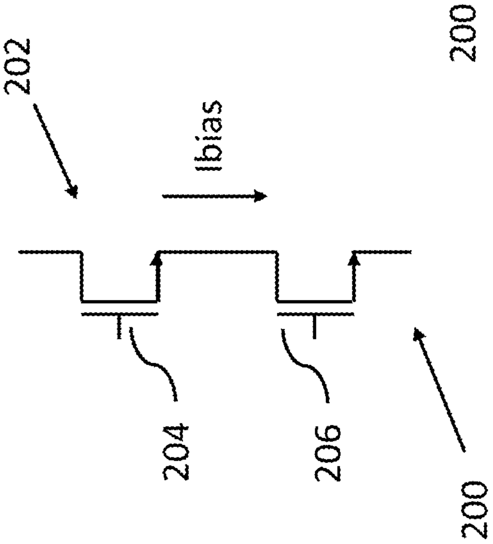
Figure 2C:
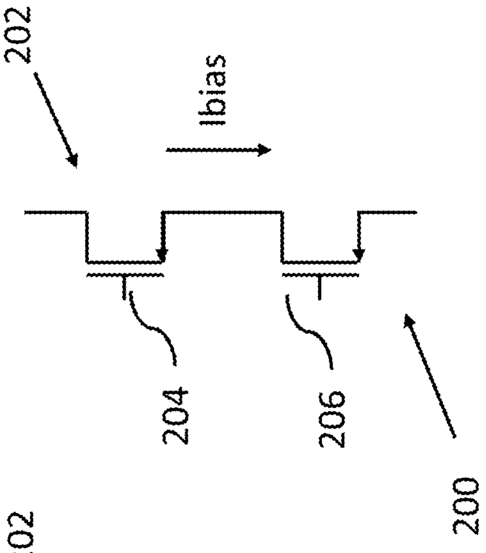

FIG. 2(*a*) is a schematic of an apparatus 200 comprising a bias current generator 202 for generating a bias current Ibias in accordance with a first embodiment of the present disclosure. The bias current generator 202 comprises two negative threshold transistors of the same type that are coupled in series. In further embodiments, the bias current generator 202 may comprise more than two negative threshold transistors. For example, PMOS and NMOS are transistor "types".

A negative threshold transistor is a transistor that will conduct a current when a voltage of 0V is applied across its gate and source.

The two negative threshold transistors may comprise a first negative threshold transistor 204 and a second negative threshold transistor 206. In further embodiments, there may be two or more second negative threshold transistors.

Figure 1:
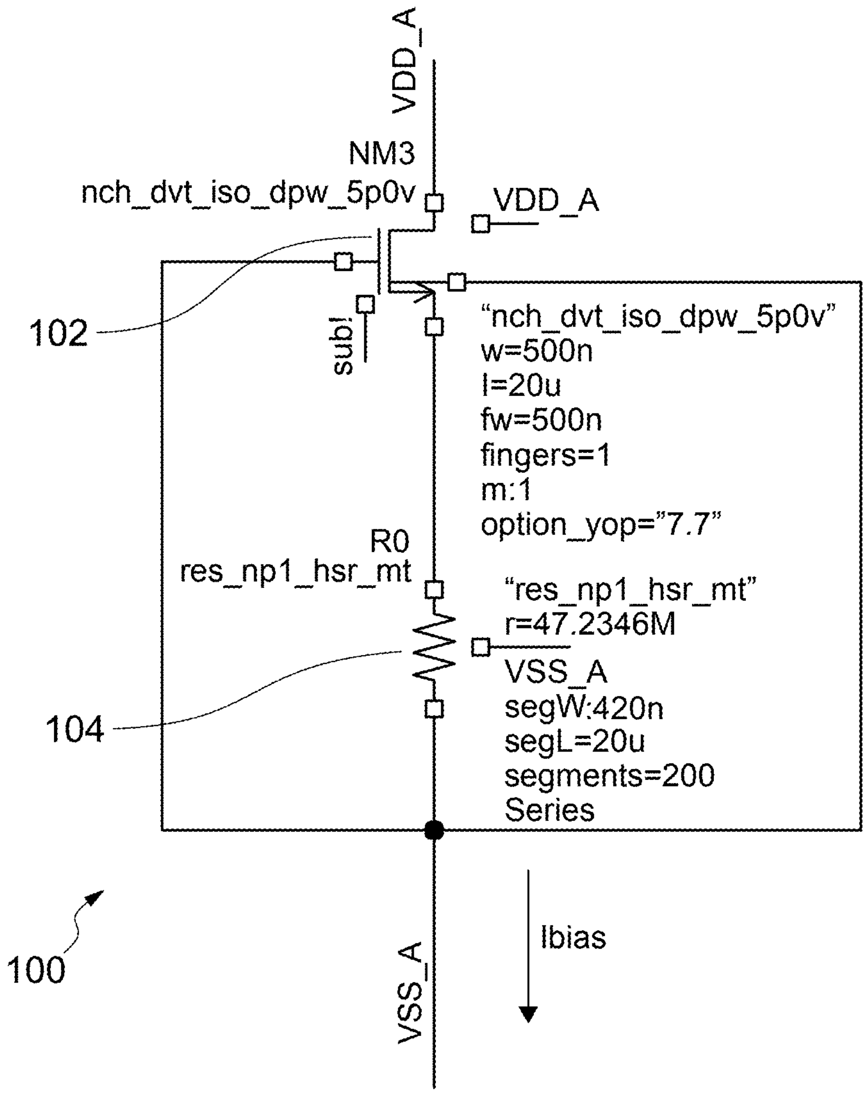
FIG. 1 is a schematic of a known bias current generator.

In comparison with the generator 100 of FIG. 1, the present embodiment replaces the poly resistor 104 with the second negative threshold transistor 206. Further embodiments may replace the poly resistor 104 with two or more second negative threshold transistors. The removal of the poly resistor 104 can result in a decrease in the bias current generator 200 size when compared with the generator 100. Therefore, embodiments of the present disclosure can provide a bias current generator that can occupy a smaller area than known systems.

The second negative threshold transistor 206 provides a resistance thereby delivering the functionality as provided by the poly resistor 104. A plurality of second negative threshold transistors coupled in series provides a resistance, with an increasing number of second negative threshold transistors in the chain providing a higher resistance value.

The one or more second negative threshold transistors in series may be referred to as a resistor device, which is descriptive of their function in providing a resistance.

In a specific embodiment, the first negative threshold transistor 204 may have a width of approximately 250 nm to approximately 500 nm and a length of approximately 20 micrometers. Additionally, or alternatively, the second negative threshold transistors 206 may have a width of approximately 500 nm and a length of approximately 20 micrometers. In further embodiments where there are two or more second threshold transistors, one or more of these second negative threshold transistors may have the dimensions as discussed previously. Multiple long channel and narrow width second negative threshold transistors, for example having the dimensions as discussed here, may be coupled in series to provide a high resistance, which may be used for nA bias current generation.

The bias current generators of the present disclosure may exhibit PVT (process, supply, temperature) variation; may require no startup; and may provide a supply independent bias current.

FIG. 2(*b*) is a schematic of a specific embodiment of the bias current generator 200 where the negative threshold transistors 204, 206 are n-type transistors, for example NMOS transistors.

FIG. 2(*c*) is a schematic of a specific embodiment of the bias current generator 200 where the negative threshold transistors 204, 206 are p-type transistors, for example PMOS transistors.

Figure 3B:
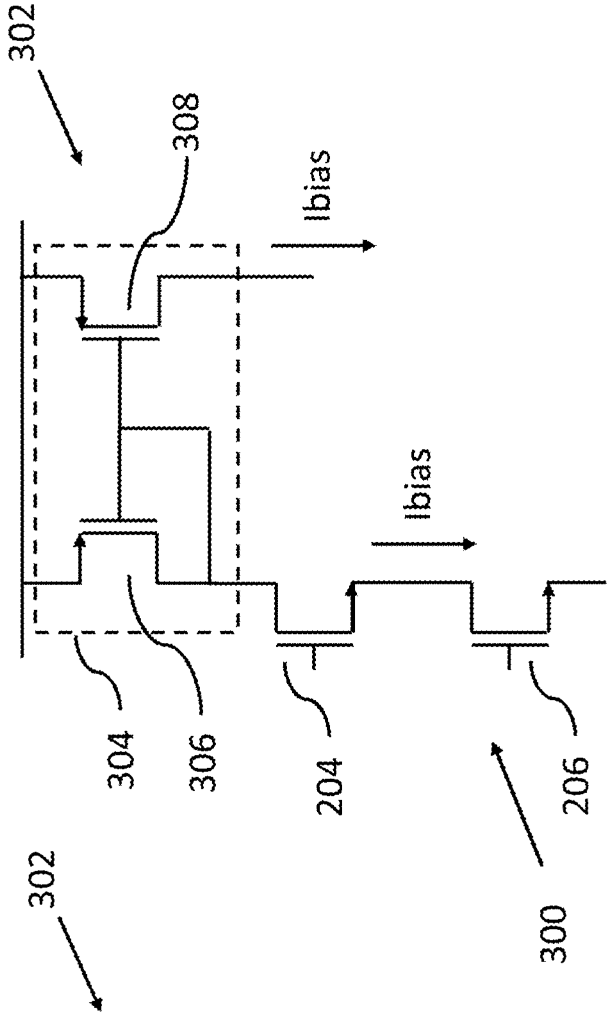
FIG. 3(*a*) is a schematic of an apparatus comprising a bias current generator in accordance with a second embodiment of the present disclosure, FIG. 3(*b*) is a schematic of the apparatus having a specific embodiment of the current mirror.
Figure 3A:
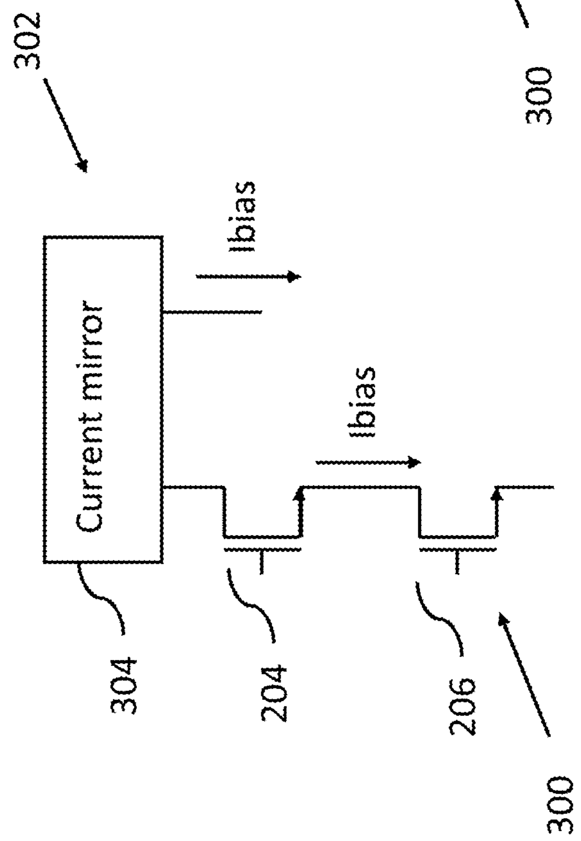

FIG. 3(*a*) is a schematic of an apparatus 300 comprising a bias current generator 302 for generating a bias current Ibias in accordance with a second embodiment of the present disclosure. The bias current generator 302 is as described for the bias current generator 202. However, in the present embodiment, the bias current generator 302 further comprises a current mirror 304 configured to output the bias current Ibias. The current mirror 304 may be used to distribute the bias current Ibias to other circuits.

In the embodiments described herein, there may be illustrated a 1:1 mirroring of the bias current Ibias. However. it will be appreciated that in further embodiments the bias current Ibias may be scaled up or down as part of the mirroring process in accordance with the understanding of the skilled person.

It will be appreciated that the embodiments described herein are illustrated using NMOS transistors. Alternatively other transistors types, such as PMOS may be used FIG. 3(*b*) is a schematic of the apparatus 300 having a specific embodiment of the current mirror 304. In the present embodiment the current mirror comprises mirror transistors 306, 308. In operation, the mirror transistor 306 receives the bias current Ibias and mirrors the bias current Ibias to the mirror transistor 308. The mirror transistor 308 then outputs the bias current Ibias.

Figures 4A, 4B, 4C:
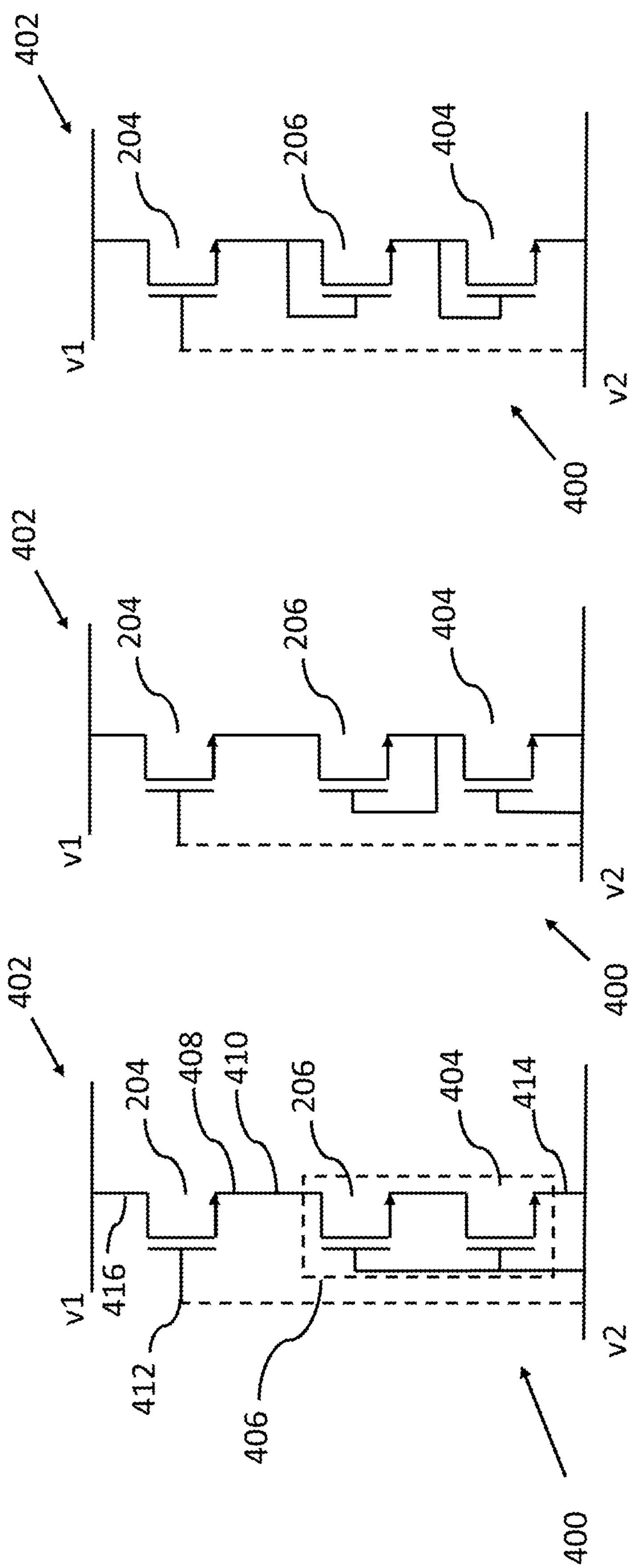
FIG. 4(*a*) is a schematic of an apparatus comprising a bias current generator in accordance with a third embodiment of the present disclosure, FIG. 4(*b*) is an alternative embodiment of the apparatus of FIG. 4(*a*), FIG. 4(*c*) is a further alternative embodiment of the apparatus of FIG. 4(*a*)

FIG. 4(*a*) is a schematic of an apparatus 400 comprising a bias current generator 402 for generating a bias current Ibias in accordance with a third embodiment of the present disclosure. In the present embodiment there is a further second negative threshold transistor 404 when compared with the previously discussed embodiments. In the present embodiment the second negative threshold transistors have their gates coupled to a voltage v2.

FIG. 4(*b*) is an alternative embodiment of the apparatus 400, where the gates of the second negative threshold transistors 206, 404 are coupled to their source terminals. FIG. 4(*c*) is an alternative embodiment of the apparatus 400, where the gates of the second negative threshold transistors 206, 404 are coupled to their drain terminals.

The second negative threshold transistors 206, 404 provide a resistance, with the different gate coupling combinations presented in FIGS. 4(*a*)-(*c*) providing different resistances, due to the different gate couplings. The sensitivity of the resistance due to process and/or temperature variations will also vary depending on the gate coupling configuration of the negative threshold transistors 206, 404.

The transistors 206, 404 may form a transistor set 406 such that a first terminal 408 of the first negative threshold transistor 204 is coupled to a first terminal 410 of the transistor set 406 and a gate terminal 412 of the first negative threshold transistor 204 is coupled to a second terminal 414 of the transistor set 406. In the embodiments shown in FIGS. 4(*a*)-(*c*) the first negative threshold transistor 204 comprises a second terminal 416 that is coupled to a voltage v1 and the second terminal 414 of the transistor set 406 is coupled to the voltage v2. For clarity, the reference numerals have only been applied to FIG. 4(*a*), however it will be evident to the skilled person that this configuration is also present in FIG. 4(*b*) and FIG. 4(*c*) and some of the other embodiments as disclosed herein.

Figure 5B:
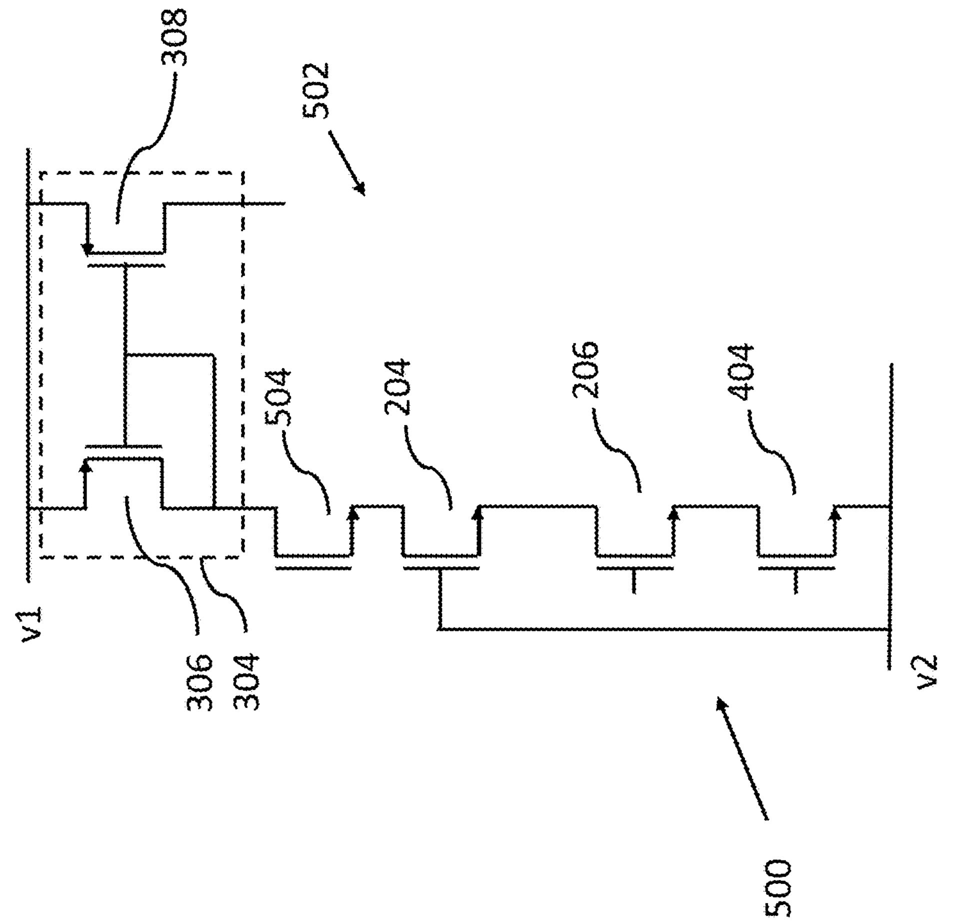
FIG. 5(*a*) is a schematic of an apparatus in accordance with a fourth embodiment of the present disclosure, FIG. 5(*b*) is a schematic of an alternative embodiment of the apparatus of FIG. 5(*a*)
Figure 5A:
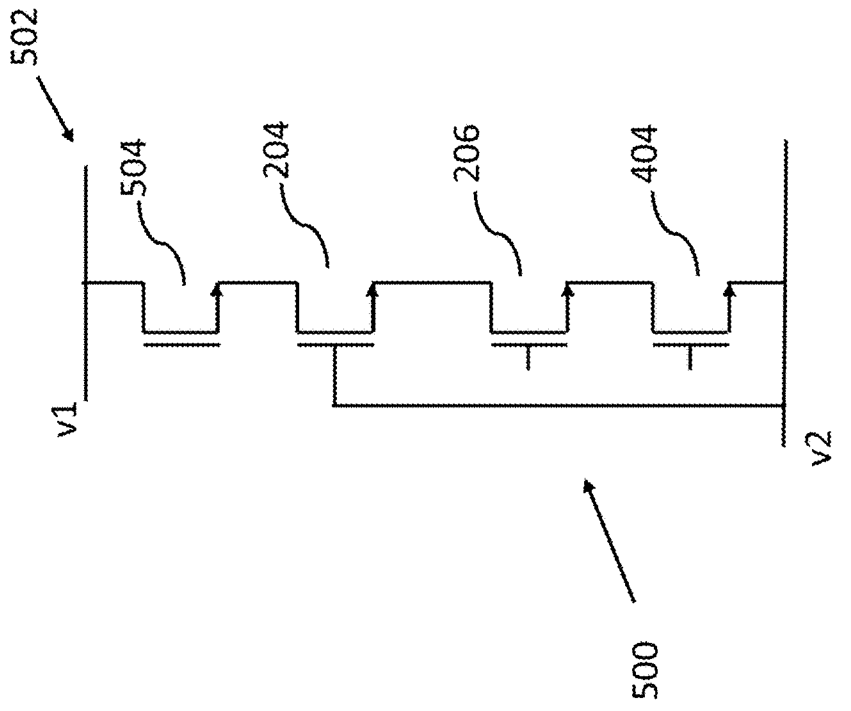

FIG. 5(*a*) is a schematic of an apparatus 500 comprising a bias current generator 502 for generating a bias current Ibias in accordance with a fourth embodiment of the present disclosure. In the present embodiment, the bias current generator 502 further comprises a cascode transistor 504. The terminal 416 is coupled to the voltage v1 via the cascode transistor 504.

The cascode transistor 504 is configured to protect the first negative threshold transistor 204 from variations in the supply voltage (in the present embodiment represented by v1) using the cascode technique. The cascode transistor 504 and the first negative threshold transistor 204 may be of the same type, which in the present example is NMOS. FIG. 5(*b*) is a schematic of an alternative embodiment of the apparatus 500 further comprising the current mirror 304.

It will be appreciated that in FIGS. 5(*a*)-(*b*), and in any other embodiments disclosed herein, the gate coupling of the negative threshold transistors 206, 404 may be as shown in one of FIGS. 4(*a*)-(*c*) or in any other suitable configuration in accordance with the understanding of the skilled person.

Figure 6A:
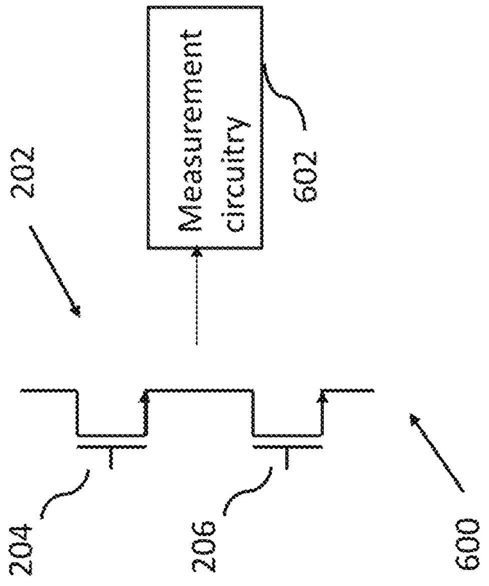
FIG. 6(*a*) is a schematic of an apparatus comprising the bias current generator in accordance with a fifth embodiment of the present disclosure, FIG. 6(*b*) is a schematic of the apparatus showing a specific embodiment of the measurement circuitry, FIG. 6(*c*) is a schematic of the apparatus showing a further specific embodiment of the measurement circuitry.
Figure 6B:
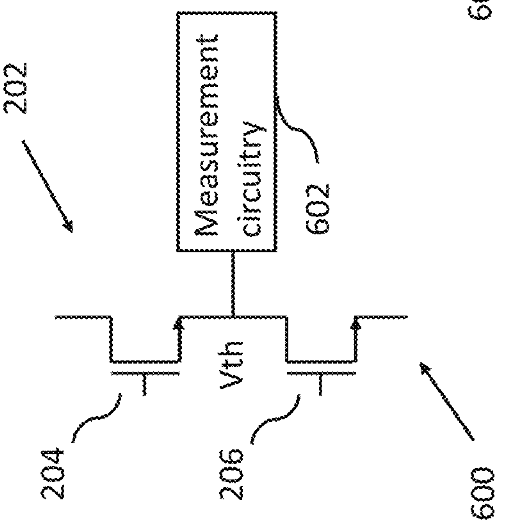
Figure 6C:
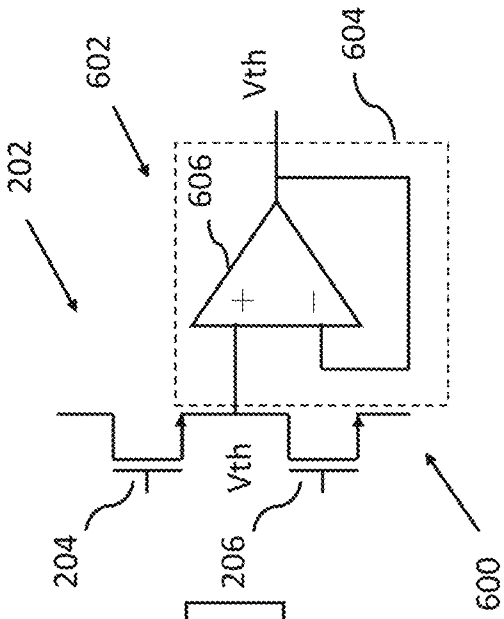

FIG. 6(*a*) is a schematic of an apparatus 600 comprising the bias current generator 202 for generating a bias current Ibias in accordance with a fifth embodiment of the present disclosure. The apparatus 600 comprises measurement circuitry 602 configured to measure a first quantity that is dependent on the bias current Ibias.

The first quantity may, for example, comprise a threshold voltage Vth, where the threshold voltage Vth is dependent on the bias current Ibias. The threshold voltage Vth may be the threshold voltage Vth of any of the negative threshold transistors of the bias current generator 202.

FIG. 6(*b*) is a schematic of the apparatus 600, showing a specific embodiment where the measurement circuitry 602 is coupled to the terminal between the first and second negative threshold transistors 204, 206 to measure the threshold voltage Vth of the first negative threshold transistor 204.

Measurement of the threshold voltage Vth provides a faster and more accurate method of measuring the bias current Ibias than as provided by the system of FIG. 1. Specifically, there is a relationship between the bias current Ibias and the threshold voltage Vth in the bias current generators as disclosed herein that means that the bias current Ibias can be determined by a threshold voltage Vth measurement, and without additional measurements. This is not possible in the system of FIG. 1, as the use of the poly resistor 104 means that the resistance of the poly resistor 104 must also be measured to evaluate the bias current Ibias.

In summary, the bias current Ibias can be measured simply by measuring the threshold voltage Vth of one of the negative threshold transistors, thereby providing a faster method of current measurement than is possible in known systems. This is because two negative threshold transistors of the same type coupled in series will track each other over process and temperature variations. Furthermore, bias current Ibias is proportional to threshold voltage Vth in circuits having this configuration.

FIG. 6(*c*) is a schematic of the apparatus 600 showing a specific embodiment of the measurement circuitry 602. In the present embodiment, the measurement circuitry comprises a buffer circuit 604 coupled to the threshold voltage terminal and configured to output the threshold voltage Vth. The buffer circuit 604 comprises an op amp 606 in the present embodiment. A buffer circuit 604 is usually very fast settling.

Figures 7A, 7B, 7C:
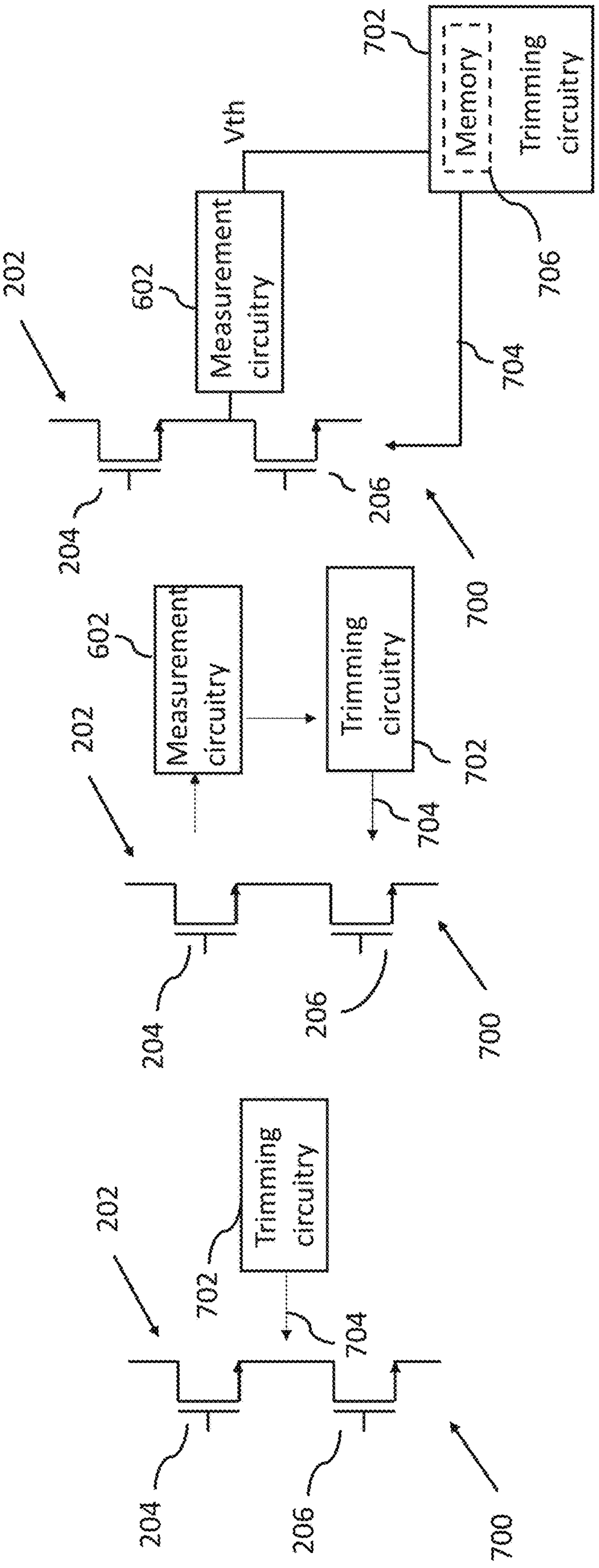
FIG. 7(*a*) is a schematic of an apparatus comprising the bias current generator in accordance with a sixth embodiment of the present disclosure, FIG. 7(*b*) is a schematic of the apparatus comprising the bias current generator in accordance with a seventh embodiment of the present disclosure, FIG. 7(*c*) is a schematic of the apparatus having a specific measurement circuitry and trimming circuitry arrangement, FIG. 7(*d*) is a schematic of an apparatus in accordance with an eighth embodiment of the present disclosure.
Figure 7D:
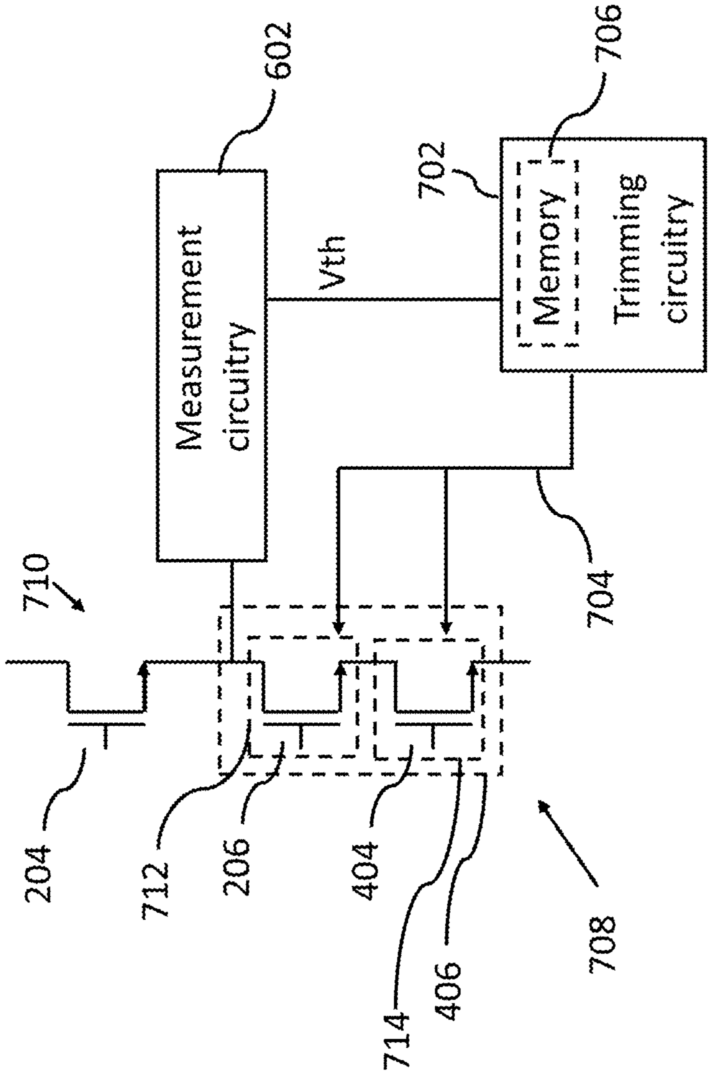

FIG. 7(*a*) is a schematic of an apparatus 700 comprising the bias current generator 202 for generating a bias current ibias in accordance with a sixth embodiment of the present disclosure. In the present embodiment, the apparatus 700 comprises trimming circuitry 702 configured to provide a trimming signal 704 to the bias current generator 202. The bias current generator 202 is configured to adjust the bias current Ibias in response to the trimming signal 704 to provide a desired bias current Ibias.

The trimming circuitry 702 is arranged to provide a trimming function. Trimming is a well-known procedure in the technical field, where a circuit may provide an output that is not as intended, and an aspect of the circuit is adjusted to provide the desired output. In the present area of bias current generation, a bias current generator may generate a bias current that does not have the value as intended, for example due to process or temperature variations. The trimming procedure acts to adjust one or more aspects the bias current generator until the bias current value is as desired.

FIG. 7(*b*) is a schematic of the apparatus 700 comprising the bias current generator 202 for generating a bias current Ibias in accordance with a seventh embodiment of the present disclosure. In the present embodiment, and compared with the apparatus shown in FIG. 7(*a*), the apparatus 700 further comprises the measurement circuitry 602.

In operation, the measurement circuitry 602 measures the first quantity, which is then provided to the trimming circuitry 702. The trimming circuitry 704 determines the suitable trimming signal 704 necessary to provide to the bias current generator 202 such that the bias current generator 202 will adjust the bias current Ibias to provide the desired bias current Ibias. The trimming signal 704 as determined is then provided to the bias current generator 202.

FIG. 7(*c*) is a schematic of the apparatus 700 having a specific measurement circuitry 602 and trimming circuitry 702 arrangement. In the present embodiment, the first quantity comprises the threshold voltage Vth which may be measured as described previously for FIGS. 6(*b*) and FIG. 6(*c*).

The trimming of the bias current generator can be carried out in production more reliably and quicker than known methods due to the increased speed with which the Ibias current can be determined using the methods and tools of the present disclosure.

The trimming circuitry 702 may comprise a memory element 706 configured to store a look up table comprising a plurality of trimming signal settings, where each trimming signal setting is associated with a value of the first quantity. As bias current can be related to the first quantity (for example, where it comprises the threshold voltage Vth), it is possible to trim using the lookup table.

In a specific embodiment, the trimming circuitry 702 may be configured to determine the trimming signal 704 by selecting, from the look up table, the trimming signal setting associated with the value of the first quantity as received by the trimming circuity 702 and setting the trimming signal 704 based on the trimming signal setting as selected.

As discussed previously, the first quantity may comprise the threshold voltage Vth, such that the value of the first quantity as received by the trimming circuit 702 is the value of the measured threshold voltage Vth.

FIG. 7(*d*) is a schematic of an apparatus 708 in accordance with an eighth embodiment of the present disclosure. Compared with the apparatus 700 of FIG. 6(*c*), in the present embodiment, the apparatus comprises a bias current generator 710 having two second negative threshold transistors 206, 404. The bias current generator 710 comprises the transistor set 406 which comprises bit portions 712, 714, with each bit portion 712, 714 comprising one of the second negative threshold transistors 206, 404. The trimming signal 704 is configured to set each bit portion in an enabled or disabled state to adjust the bias current provided by the bias current generator 710.

Enabled may refer to the normal operation of the second negative threshold transistor of the bit portion, where its resistance contributes to the bias current generation. Disabled may refer to the second negative threshold transistor being bypassed. This functionality may be provided by having a switch in parallel with each bit portion, such that in the enabled state the switch is open, such that current will flow through the transistor, and in the disabled state the switch is closed such that current will flow through the switch, and not the transistor.

Although FIGS. 6(*a*)-(*c*) and FIGS. 7(*a*)-(*c*) are shown for the bias current generator 202 of FIG. 2(*b*), it will be appreciated that further embodiments may alternatively comprise any of the other bias current generators as disclosed herein, or any combination of features of bias current generators as disclosed herein, in accordance with the understanding of the skilled person.

Figure 8A:
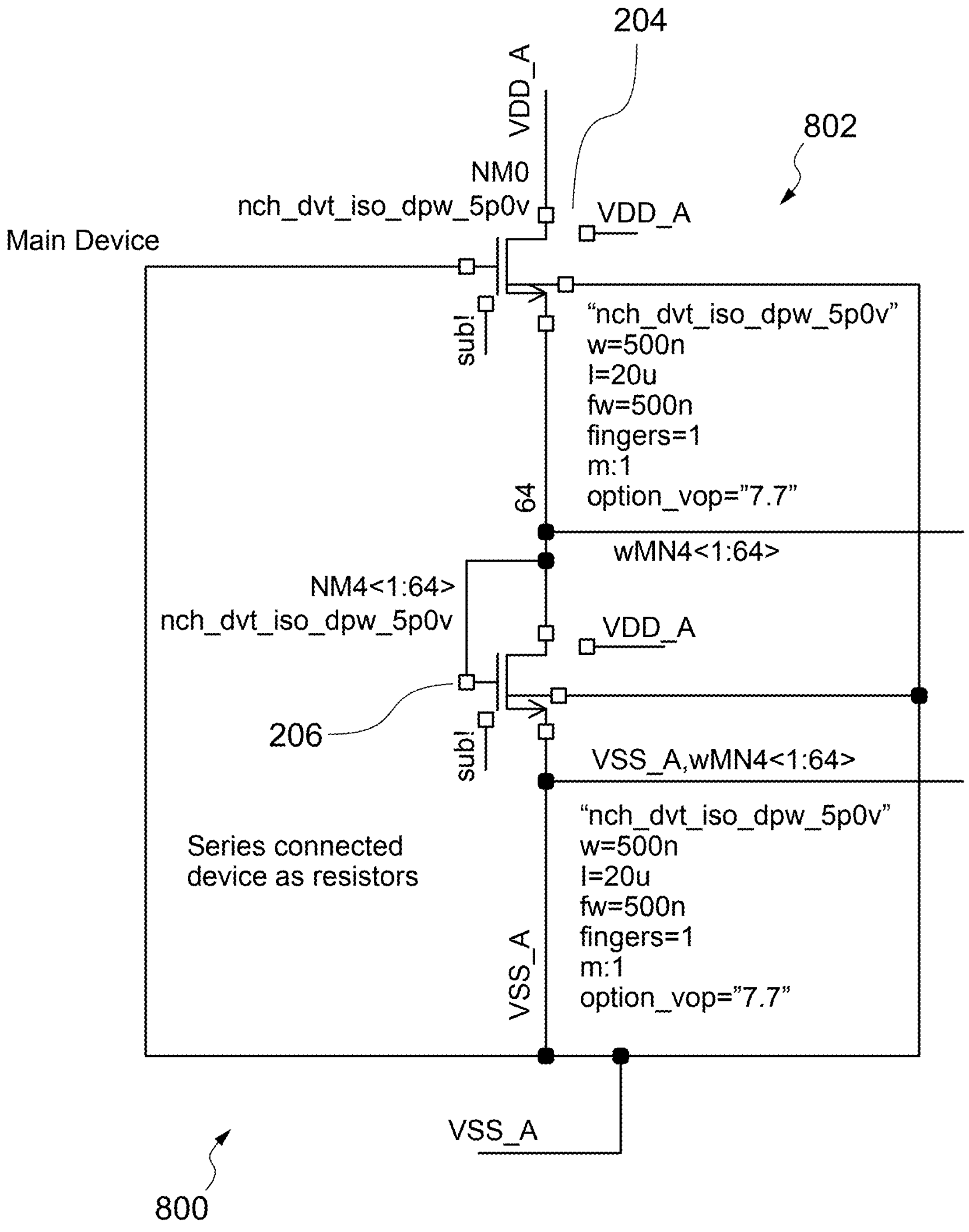
FIG. 8(*a*) is a schematic of an apparatus comprising a bias current generator in accordance with a ninth embodiment of the present disclosure, FIG. 8(*b*) is a schematic of illustrating the relative size of the second negative threshold compared with the poly resistor.
Figure 8B:
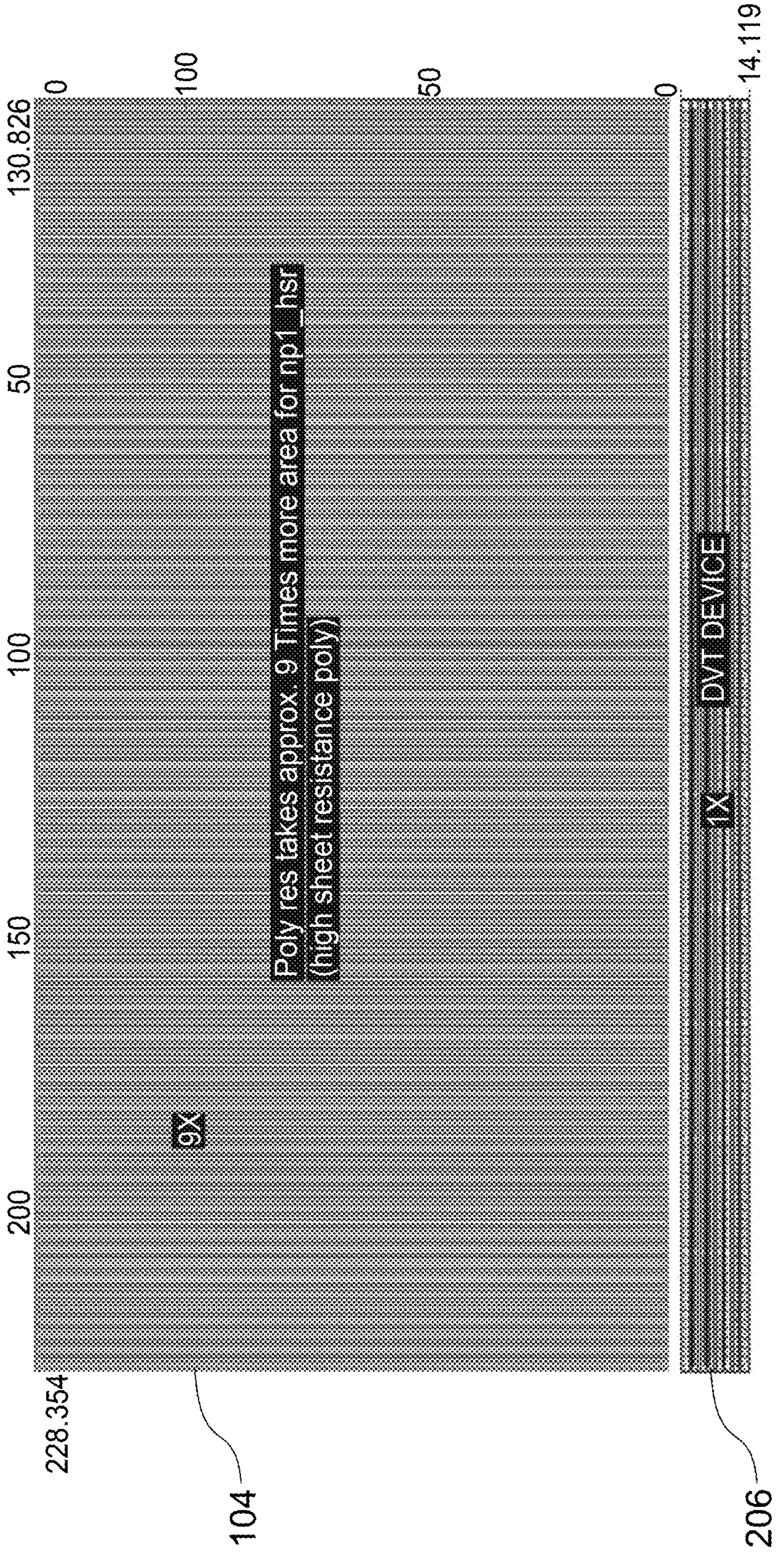

FIG. 8(*a*) is a schematic of an apparatus 800 comprising a bias current generator 802 for generating a bias current Ibias in accordance with a ninth embodiment of the present disclosure. In the present embodiment, the negative threshold transistors 204, 206 are NMOS type, however it will be appreciated that in further embodiments they may, for example, be PMOS type.

FIG. 8(*b*) is a schematic of illustrating the relative size a practical implementation of the second negative threshold transistor 206 compared with a practical implementation of the poly resistor 104. In this example, the second negative threshold transistor 206 occupies approximately nine times less area than the poly resistor 104.

Figure 9A:
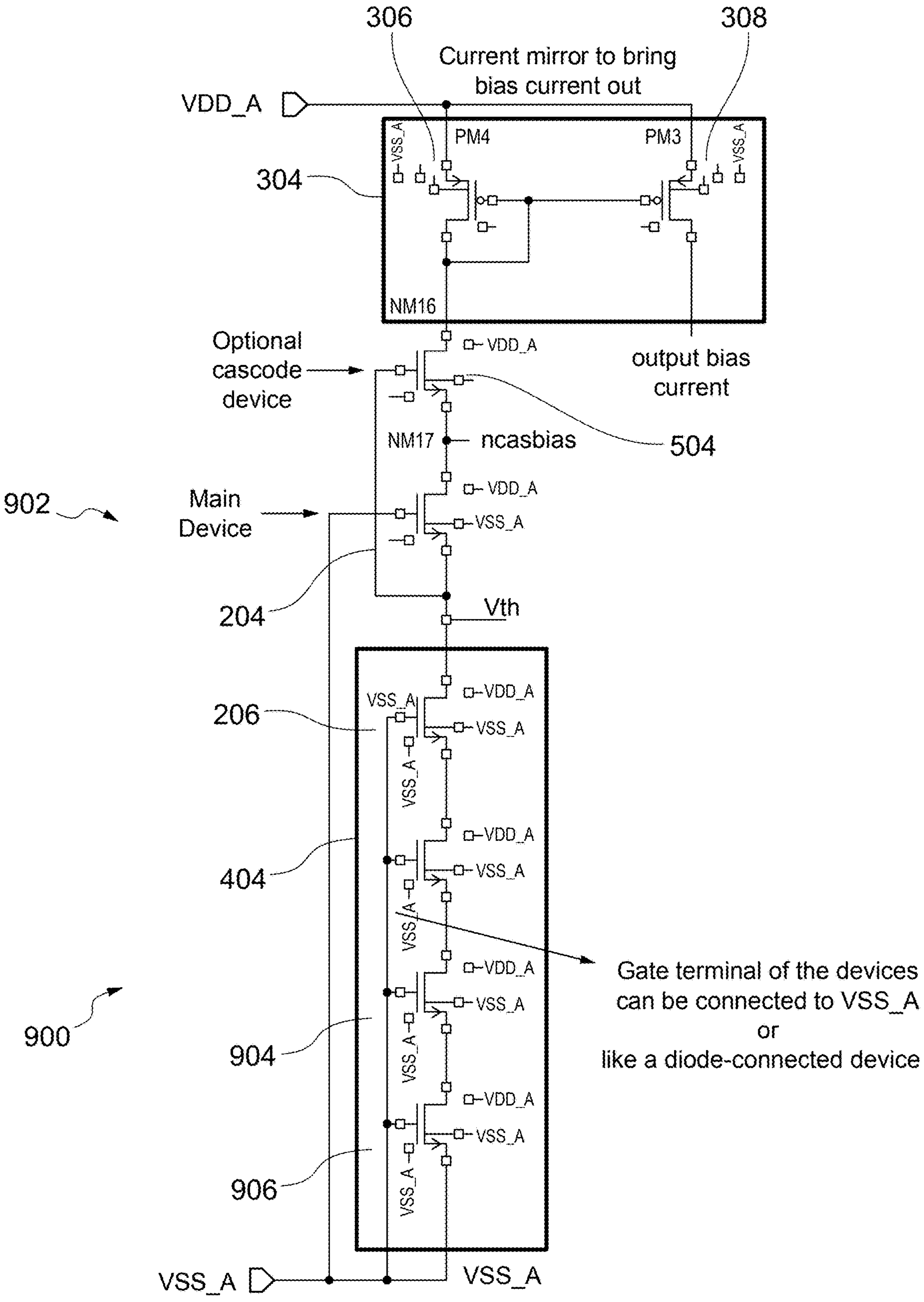
FIG. 9(*a*) is a schematic of an apparatus comprising a bias current generator in accordance with a tenth embodiment of the present disclosure, FIG. 9(*b*) is a schematic of an apparatus comprising a bias current generator in accordance with an eleventh embodiment of the present disclosure.
Figure 9B:
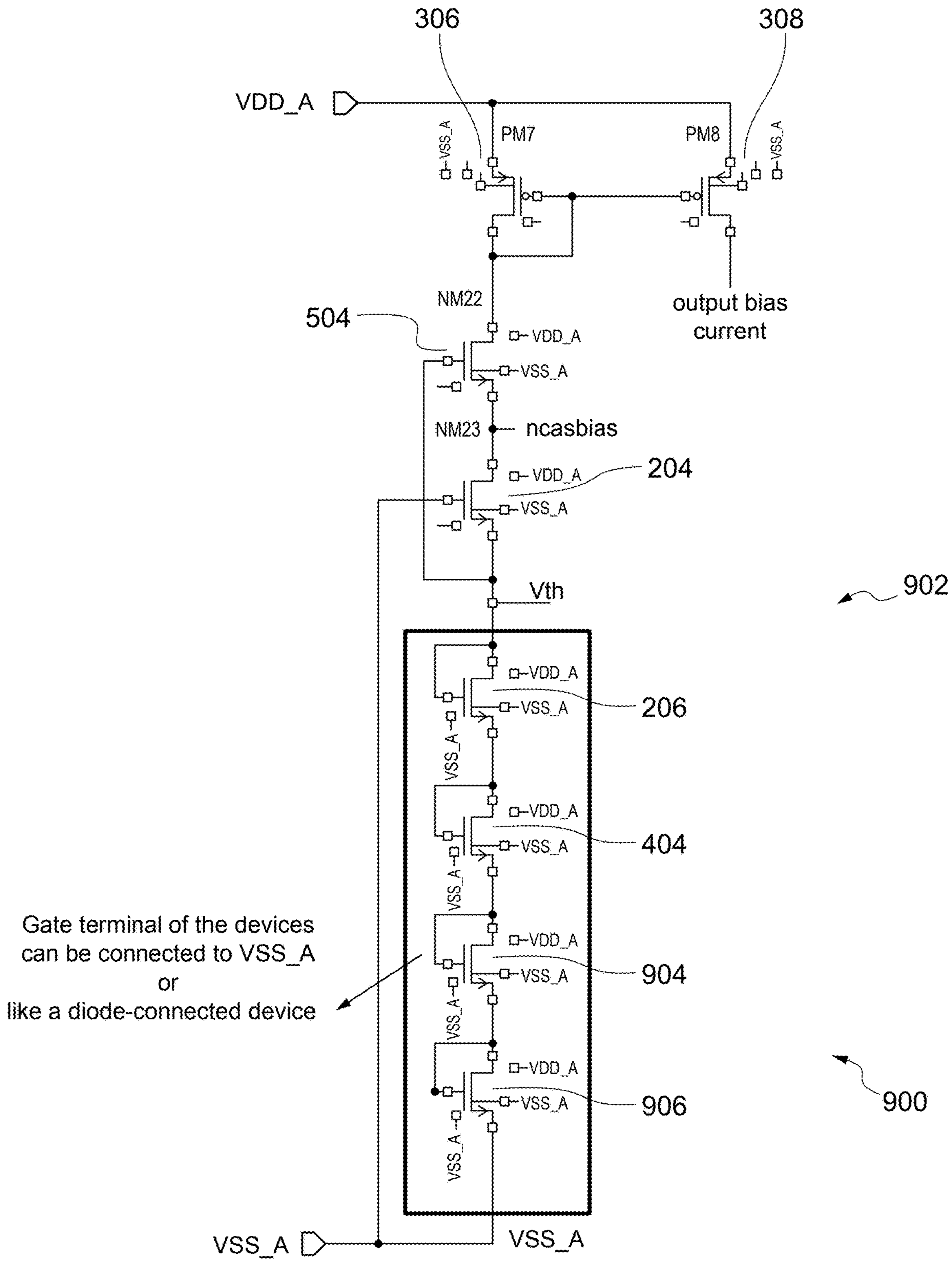

FIG. 9(*a*) is a schematic of an apparatus 900 comprising a bias current generator 902 for generating a bias current Ibias in accordance with a tenth embodiment of the present disclosure. In the present embodiment, the bias current generator 902 comprises second negative threshold transistors 206, 404, 904, 906 having their gates coupled to the voltage VSS_A.

FIG. 9(*b*) is a schematic of an apparatus 908 comprising a bias current generator 910 for generating a bias current Ibias in accordance with an eleventh embodiment of the present disclosure. In the present embodiment, the bias current generator 910 comprises second negative threshold transistors 206, 404, 904, 906 having their gates coupled to their drains.

Figure 10:
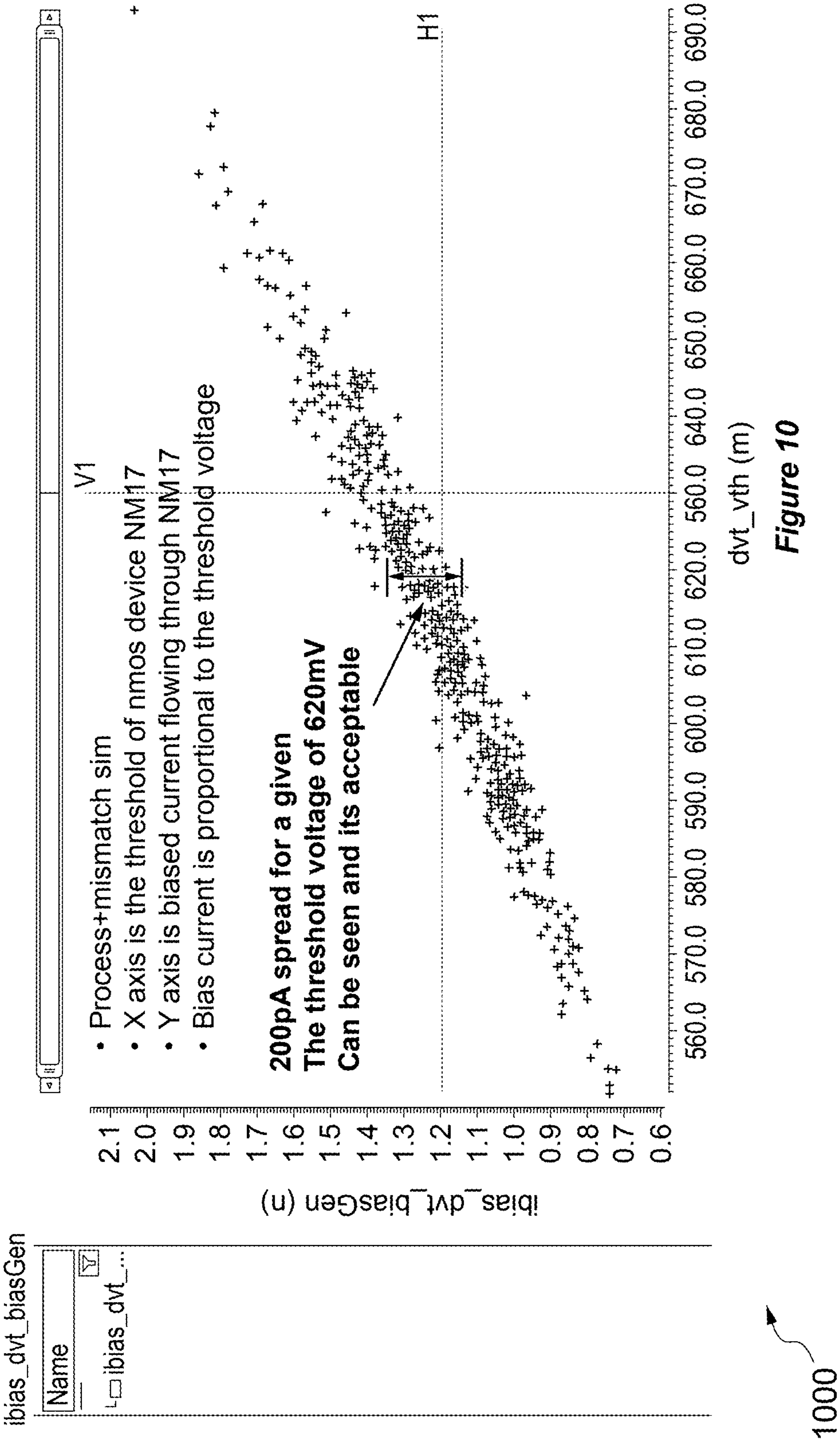
FIG. 10 is a graph showing a relationship between the threshold voltage and the bias current for an embodiment of a bias current generator.

FIG. 10 is a graph 1000 showing a relationship between the threshold voltage Vth and the bias current Ibias for a practical implementation of an embodiment of a bias current generator as disclosed herein. It can be observed that bias current Ibias is proportional to the threshold voltage Vth. Therefore it is possible to determine the bias current Ibias from a measurement of the threshold voltage Vth.

The x-axis (millivolts) is the threshold of the first negative threshold transistor 204, with the y-axis (nanoamperes) being the bias current Ibias flowing through the transistor 204. Such a relationship may be derived from simulation and/or experimental measurement, in accordance with the understanding of the skilled person. This may then be used generate a suitable look up table for providing the necessary trimming functionality.

Figure 11A:
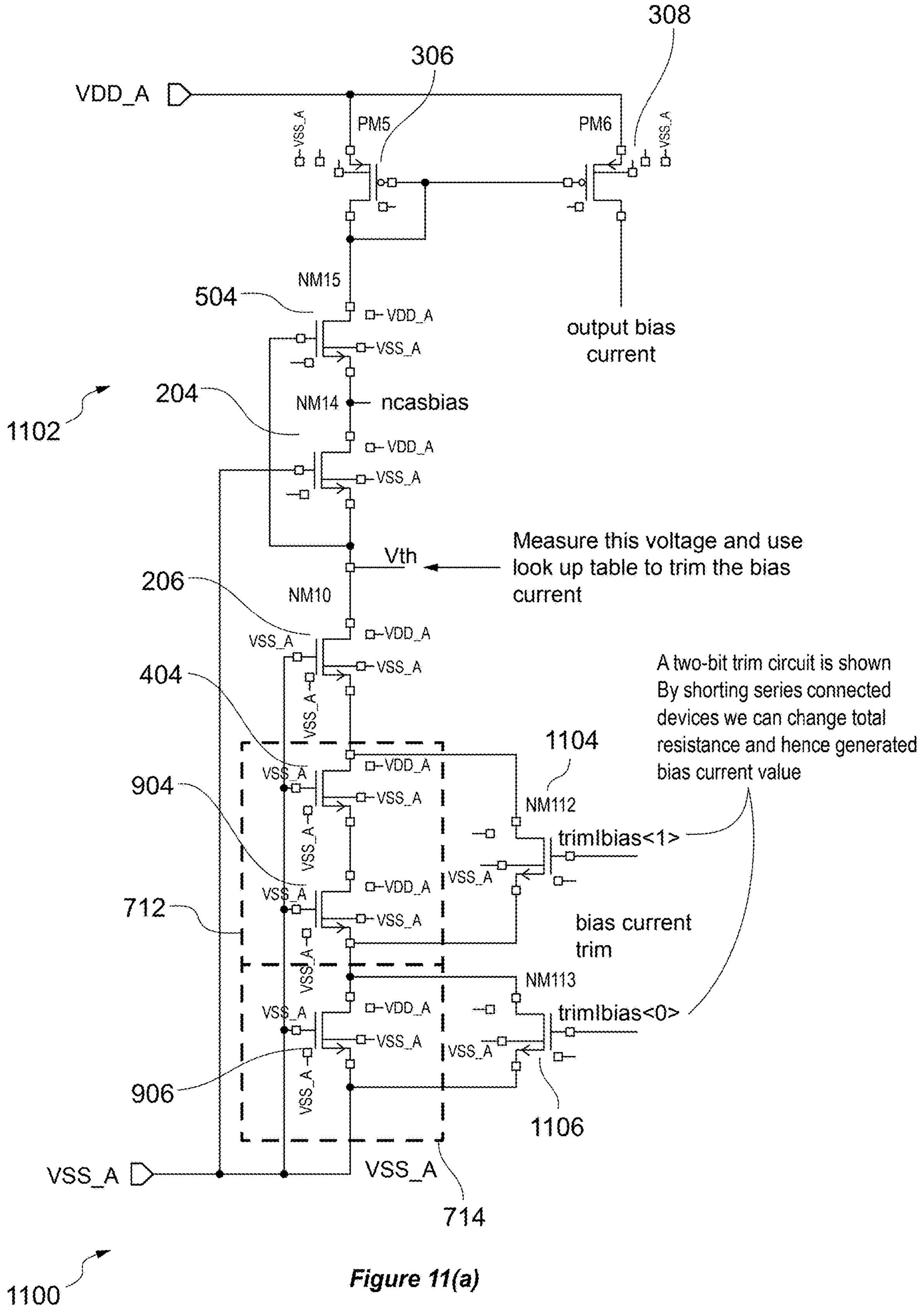
FIG. 11(*a*) is a schematic of an apparatus comprising a bias current generator in accordance with a twelfth embodiment of the present disclosure, FIG. 11(*b*) is a schematic of the apparatus showing an alternative embodiment with the gate coupling of the second negative threshold transistors differing from as shown in FIG. 11(*a*), FIG. 11(*c*) is a table showing an example look up table.
Figure 11B:
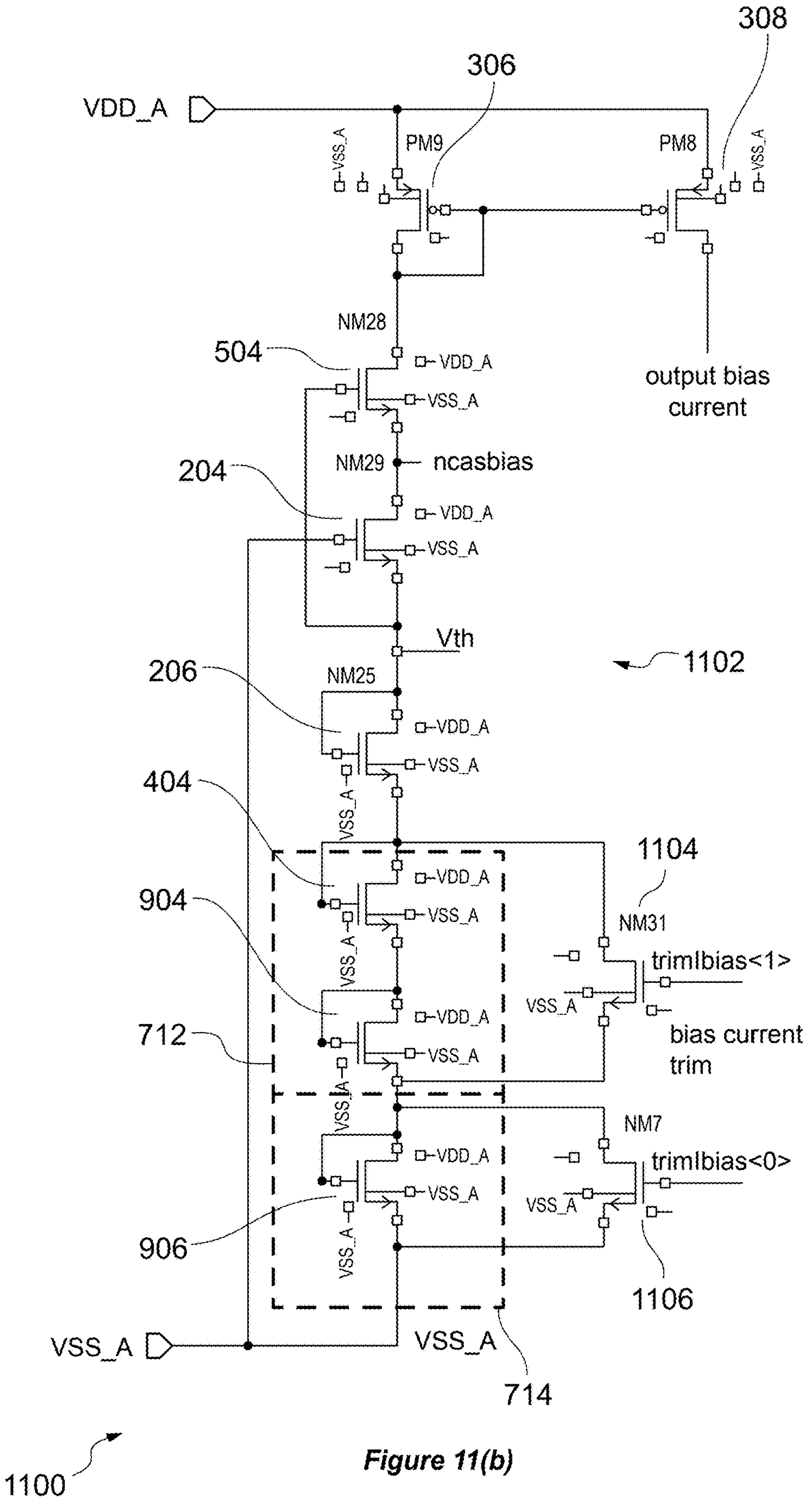

FIG. 11(*a*) is a schematic of an apparatus 1100 comprising a bias current generator 1102 for generating a bias current Ibias in accordance with a twelfth embodiment of the present disclosure. The present embodiment includes circuitry for trimming. Specifically, there are includes switches 1104, 1106 in parallel with bit portions 712, 714. This circuitry provides two-bit trimming. By shorting the series connected second negative threshold transistors of a bit portion, it is possible to change the total resistance of the transistor set 406, thereby altering the bias current Ibias. The measurement circuitry 602 and trimming circuitry 702 have been omitted from this drawing to aid clarity of the schematic. However, it will be appreciated that they are used in this embodiment to measure the threshold voltage Vth and then provide the required trimming functionality.

The switches 1104, 1106 may, for example, be implemented using PMOS devices or transmission gates.

FIG. 11(*b*) is a schematic of the apparatus 1100 showing an alternative embodiment with the gate coupling of the second negative threshold transistors differing from as shown in FIG. 11(*a*).

FIG. 11(*c*) is a table 1103 showing an example look up table that may be stored in the memory element 706 of the trimming circuitry 702. In operation, when a voltage threshold Vth in the lefthand column is measured, the trimming signal 704 is generated based on the corresponding trim code (in this example a 4-bit trim code) in the right hand column, to control the bit portions 712, 714, to provide the required resistance of the transistor set 406, and therefore the trimmed bias current Ibias. This procedure may be undertaken during chip production. In the present example, the look up table shows threshold voltage Vth through the first negative threshold transistor 204 versus the bias current flowing through the first negative threshold transistor 204.

In summary, the use of bit portions 712, 714 having parallel coupled switches 1104, 1106 enables trimming by provides a mechanism for adding and/or removing the series coupled second negative threshold transistors 404, 904, 906.

Consider the transistor 906 as functions as a resistor R then the series coupling of transistors 404, 904 provide a resistance of 2R. If we include 4 such devices it will offers 4R. In the present embodiment, there is shown a two bit binary array with the transistor 906 being the least significant bit (LSB).

Instead of using one device as LSB It is possible to use a combination of devices to create LSB (where some of them have gate connected to vss and some of them are connected to drain or source).

If we bring the buffered threshold voltage terminal out via test mux we can simply look at the threshold voltage Vth and predict what the bias current Ibias is with an approximate +/−10% accuracy, as illustrated by FIG. 10.

It will be appreciated that in a practical implementation, trimming accuracy of +/−10% is sufficient and therefore coarse trimming codes may be used. Final trimming accuracy will be limited by the mismatch as shown on FIG. 10. For example, for a given measured voltage threshold Vth, a bias current of 1 nA could be +/100 pA within target.

In known systems it is not possible to trim a nA bias current in production economically because of the massive settling time related to measuring nA current and trim code sweep using the poly resistor 104. Large trim time will lead to significant cost issues. This is resolved by the embodiments disclosed herein.

The trimming methods disclosed herein do not require nA range current measurement, which cannot be done in production reliably and fast. In the embodiments disclosed herein it is possible to measure the threshold voltage Vth and use a lookup table to apply the trim function. This results in a faster process than known systems which require both a measurement of the poly resistor 104 resistance and the threshold voltage Vth.

In summary, it is possible to trim a generated bias current Ibias in a time-efficient and hence low-cost manner by simply measuring the threshold voltage Vth of the first negative threshold transistor 204 and using a look-up table FIG. 12(*a*) is a table 1200 showing example simulation results for a practical implementation of the bias current generator 800 of the present disclosure. FIG. 12(*b*) is a table 1201 showing simulation results for a practical implementation of the circuit of FIG. 1, using the poly resistor 104. Shown on both tables is a bias current 1202 as measured for different temperature values 1204.

There was found to be 30% less temperature variation through the use of the second negative threshold device 206 than the poly resistor-based bias generator of the circuit 100. Furthermore, the bias current generator 800 of the present disclosure can be fine-tuned to reduce variation further.

Temperature coefficient of the bias current can be adjusted based on the size and dimensions of the negative threshold transistors and their gate connections, as discussed previously.

The impact of the width (W) and length (L) of the negative threshold transistors is summarised below for practical implementations of the bias current generators as disclosed herein:

- W/L=250 nm/20 μm, gives 6×PVT variation in current and 2.6× temperature variation.
- W/L of 500 nm/20 μm for first negative threshold transistor 204 and 500 nm/20 μm for second negative threshold transistors gives 4×PVT and 1.7× temperature variation.
- We can fine-tune PVT or temperature spread depending on the requirements of a given application.
- Generally, a bigger device gives better PVT spread and temperature spread
- Above 500 nm micron width, returns were found to be diminishing.
- It is anticipated that other size combination will provide a performance in the range stated above.

By reducing one or more of process, supply and temperature variations compared with known systems, there can be provided more reliable and repeatable bias current generation circuitry with reduced variation in performance between different circuits.

Common reference numerals or variables between Figures represent common features.

Various improvements and modifications may be made to the above without departing from the scope of the disclosure.

The invention claimed is:

1. An apparatus comprising:

a bias current generator comprising two or more negative threshold transistors coupled in series, wherein the bias current generator is configured to generate a bias current;

a measurement circuitry configured to measure a first quantity that is dependent on the bias current; and a trimming circuitry configured to:

receive the measurement of the first quantity;

based on the measurement of the first quantity, determine a trimming signal necessary to provide to the bias current generator such that the bias current generator will adjust the bias current to provide a desired bias current; and provide the trimming signal determined to the bias current generator, wherein the bias current generator adjusts the bias current in response to the trimming signal to provide the desired bias current.

2. The apparatus of claim 1, wherein the two or more negative threshold transistors are NMOS or PMOS.

3. The apparatus of claim 1, wherein the bias current generator comprises a current mirror configured to output the bias current.

4. The apparatus of claim 3, wherein the current mirror comprises:

a first mirror transistor; and a second mirror transistor; wherein:

the first mirror transistor is configured to receive the bias current and to mirror the bias current to the second mirror transistor; and the second mirror transistor is configured to output the bias current as received from the first mirror transistor.

5. The apparatus of claim 1, wherein the two or more negative threshold transistors comprise:

a first negative threshold transistor; and one or more second negative threshold transistors.

6. The apparatus of claim 5, wherein a gate terminal of at least one of the one or more second negative threshold transistors is coupled to:

a second voltage;

a drain terminal of at least one of the one or more second negative threshold transistors; or a source terminal of at least one of the one or more second negative threshold transistors.

7. The apparatus of claim 5, wherein:

the bias current generator comprises a transistor set comprising the one or more second negative threshold transistors;

the first negative threshold transistor comprising:

a first terminal and a gate terminal, wherein:

the first terminal is coupled to a first terminal of the transistor set comprising the one or more second negative threshold transistors; and the gate terminal is coupled to a second terminal of the transistor set comprising the one or more second negative threshold transistors.

8. The apparatus of claim 7, wherein the first negative threshold transistor comprises a second terminal coupled to a first voltage and/or the second terminal of the transistor set, comprising the one or more second negative threshold transistors, is coupled to a second voltage.

9. The apparatus of claim 1, comprising measurement circuitry configured to measure a first quantity that is dependent on the bias current.

10. The apparatus of claim 9, wherein the first quantity comprises a threshold voltage, the threshold voltage being dependent on the bias current.

11. The apparatus of claim 1, wherein the first quantity comprises a threshold voltage, the threshold voltage being dependent on the bias current.

12. The apparatus of claim 1, wherein the trimming circuitry comprises a memory element configured to store a look up table comprising a plurality of trimming signal settings, each trimming signal setting being associated with a value of the first quantity.

13. The apparatus of claim 12, wherein the trimming circuitry is configured to determine the trimming signal by:

selecting, from the look up table, the trimming signal setting associated with the value of the first quantity as received by the trimming circuitry; and setting the trimming signal based on the trimming signal setting as selected, thereby determining the trimming signal.

14. The apparatus of claim 13, wherein the first quantity comprises a threshold voltage, the threshold voltage being dependent on the bias current, such that the value of the first quantity as received by the trimming circuitry circuit is the value of the threshold voltage measured.

15. The apparatus of claim 1, wherein:

the two or more negative threshold transistors comprises:

a first negative threshold transistor; and a plurality of second negative threshold transistors;

the bias current generator comprises a transistor set comprising a plurality of bit portions, each bit portion comprising at least one of the second negative threshold transistors; and the trimming signal is configured to set each bit portion in an enabled or disabled state.

16. The apparatus of claim 15, wherein the trimming circuitry comprises a memory element configured to store a look up table comprising a plurality of trimming signal settings, each trimming signal setting being associated with a value of the first quantity.

17. The apparatus of claim 16, wherein the trimming circuitry is configured to determine the trimming signal by:

selecting, from the look up table, the trimming signal setting associated with the value of the first quantity as received by the trimming circuitry; and setting the trimming signal based on the trimming signal setting as selected, thereby determining the trimming signal.

18. A method comprising:

generating a bias current by a bias current generator comprising two or more negative threshold transistors coupled in series;

measuring, by a measurement circuitry, a first quantity that is dependent on the bias current;

based on the measurement of the first quantity, determining, by a trimming circuit, a trimming signal necessary to provide to the bias current generator such that the bias current generator will adjust the bias current to a desired bias current; and providing, by the trimming circuitry, the determined trimming signal to the bias current generator, wherein the bias current generator adjusts the bias current in response to the trimming signal to provide the desired bias current.

* * * * *